US012781695B2

(12) United States Patent
Nakano et al.

(10) Patent No.: US 12,781,695 B2
(45) Date of Patent: Nov. 3, 2026

(54) SADDLED VEHICLE

(71) Applicant: HONDA MOTOR CO., LTD., Tokyo (JP)

(72) Inventors: Jun Nakano, Tokyo (JP); Hiromasa Okada, Tokyo (JP); Seiichiro Eguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 280 days.

(21) Appl. No.: 18/619,201

(22) Filed: Mar. 28, 2024

(65) Prior Publication Data

US 2024/0328376 A1 Oct. 3, 2024

(30) Foreign Application Priority Data

Mar. 29, 2023 (JP) ................................ 2023-054150

(51) Int. Cl.

| | |
|---|---|
| ***F02M 35/04*** | (2006.01) |
| ***F02M 35/02*** | (2006.01) |
| ***F02M 35/024*** | (2006.01) |
| ***F02M 35/16*** | (2006.01) |

(52) U.S. Cl.

CPC ...... *F02M 35/048* (2013.01); *F02M 35/0201* (2013.01); *F02M 35/02491* (2013.01); *F02M 35/162* (2013.01)

(58) Field of Classification Search

CPC ............. F02M 35/048; F02M 35/0201; F02M 35/02491; F02M 35/162; F02M 35/02; F02M 35/04; F02M 35/10013; B62J 40/10

USPC ........................................................ 180/68.3

See application file for complete search history.

(56) References Cited

U.S. PATENT DOCUMENTS

2006/0027202 A1* 2/2006 Yoshikawa ........ F02M 35/1266 123/184.21
2006/0219201 A1* 10/2006 Seki ..................... F02M 35/162 123/184.55

FOREIGN PATENT DOCUMENTS

| | | |
|---|---|---|
| JP | S49143606 U | 12/1974 |
| JP | S5870450 U | 5/1983 |
| JP | S58147822 U | 10/1983 |
| JP | S6413253 U | 1/1989 |
| JP | H03189285 A | 8/1991 |

(Continued)

OTHER PUBLICATIONS

Translation of JP-2012056497-A accessed on Feb. 25, 2026 at www.espacenet.com (Year: 2012).*

(Continued)

*Primary Examiner* — James A Shriver, II
*Assistant Examiner* — Hilary L Johns
(74) *Attorney, Agent, or Firm* — CKC & Partners Co., LLC

(57) ABSTRACT

In a saddled vehicle (1) including an air cleaner box (30) for introducing outside air into an intake path of a power unit (P), a frame member (20) constituting a vehicle body frame (F) penetrates through the air cleaner box (30). An air inlet (31) for introducing the outside air is formed in an outer side surface of the air cleaner box (30) in a vehicle width direction. The frame member (20) is disposed along an edge of the air inlet (31) in a side view of a vehicle body. The frame member (20) includes a rectangular pipe material. An air filter (32) is housed in the air cleaner box (30). A through hole (40, 41) through which the frame member (20) passes communicates with a space (39) upstream of the air filter (32) in an intake passage.

8 Claims, 10 Drawing Sheets

(56) References Cited

FOREIGN PATENT DOCUMENTS

| | | | | |
|---|---|---|---|---|
| JP | H0478781 | A | | 3/1992 |
| JP | H0999883 | A | | 4/1997 |
| JP | 2012056497 | A | * | 3/2012 |

OTHER PUBLICATIONS

Notification of Reasons for Refusal issued Dec. 3, 2024 in the JP Patent Application No. 2023-054150.

* cited by examiner

SADDLED VEHICLE

This application is based on and claims the benefit of priority from Japanese Patent Application No. 2023-054150, filed on 29 Mar. 2023, the content of which is incorporated herein by reference.

BACKGROUND OF THE INVENTION

Field of the Invention

The present invention relates to a saddled vehicle, and more particularly, to a saddled vehicle including an air cleaner box for introducing outside air into an intake passage of a power unit in which an engine and a transmission are integrated.

Related Art

Conventionally, there has been known a saddled vehicle including an air cleaner box for introducing outside air into an intake passage of a power unit in which an engine and a transmission are integrated.

Patent Document 1 discloses a motorcycle including a main frame extending rearward and downward from a head pipe, a seat frame extending rearward and upward from the main frame and supporting a seat, and a rear frame supporting the seat frame from below, in which an air cleaner box is disposed in a space surrounded by the main frame, the seat frame, and the rear frame.

Patent Document 1: Japanese Unexamined Utility Model Application, Publication No. S64-13253

SUMMARY OF THE INVENTION

However, in a configuration in which an air cleaner box is disposed in a space surrounded by frame members, as in Patent Document 1, it is necessary to change the shape of the frame members to increase the capacity of the air cleaner box, which tends to increase the dimensions of the vehicle body.

An object of the present invention is to solve the above issue of the conventional technology and provide a saddled vehicle in which the capacity of an air cleaner box can be increased without changing the shape of a vehicle body frame.

To achieve the object, a first feature of the present invention is a saddled vehicle (1) including an air cleaner box (30) for introducing outside air into an intake path of a power unit (P), in which a frame member (20) constituting a vehicle body frame (F) of the saddled vehicle (1) penetrates through the air cleaner box (30).

A second feature is that an air inlet (31) for introducing the outside air is formed in an outer side surface of the air cleaner box (30) in a vehicle width direction, and the frame member (20) is disposed along an edge of the air inlet (31) in a side view of a vehicle body.

A third feature is that the frame member (20) includes a rectangular pipe material.

A fourth feature is that an air filter (32) is housed in the air cleaner box (30), and a through hole (40, 41) through which the frame member (20) passes communicates with a space (39) upstream of the air filter (32) in an intake passage.

A fifth feature is that the frame member (20) is a rear frame that is inclined rearward and upward in a side view of the vehicle body and that is directed inward in a vehicle width direction toward rear. The through hole (40, 41)

includes an upper through hole (40) provided in an upper rear portion of the air cleaner box (30) and a lower through hole (41) provided in a lower front portion of the air cleaner box (30). The upper through hole (40) is positioned more inward in the vehicle width direction than the lower through hole (41).

A sixth feature is that the air cleaner box (30) includes at least a main case (34) and an outer cover (33) attached to an outer side of the main case (34) in the vehicle width direction. The air inlet (31) is formed in the outer cover (33). The upper through hole (40) and the lower through hole (41) are disposed between the outer cover (33) and the main case (34).

According to the first feature, in the saddled vehicle (1) including the air cleaner box (30) for introducing outside air into the intake path of the power unit (P), since the frame member (20) constituting the vehicle body frame (F) of the saddled vehicle (1) penetrates through the air cleaner box (30), the capacity of the air cleaner box can be increased without changing the configuration or shape of the vehicle body frame. This enables the degree of freedom in the shape and arrangement of the air cleaner box to be increased while preventing the vehicle body from becoming larger.

According to the second feature, the frame member (20) is a rear frame that is inclined rearward and upward in a side view of the vehicle body and that is directed inward in the vehicle width direction toward the rear. The through holes (40, 41) include the upper through hole (40) provided in the upper rear portion of the air cleaner box (30) and the lower through hole (41) provided in the lower front portion of the air cleaner box (30). Since the upper through hole (40) is positioned more inward in the vehicle width direction than the lower through hole (41), the frame member does not block the air inlet, and the frame member functions as a guide for guiding outside air to the air inlet to improve intake efficiency.

According to the third feature, since the frame member (20) includes a rectangular pipe material, a planar portion of the frame member can further enhance the guide function of guiding outside air to the air inlet.

According to the fourth feature, since the air filter (32) is housed in the air cleaner box (30), and the through holes (40, 41) through which the frame member (20) passes communicate with the space (39) upstream of the air filter (32) in the intake passage, outside air is introduced from the gaps between the through holes and the frame member, in addition to the air inlet, thereby causing convection of the outside air in the space upstream of the air filter and improving intake efficiency.

According to the fifth feature, the frame member (20) is a rear frame that is inclined rearward and upward in a side view of the vehicle body and that is directed inward in the vehicle width direction toward the rear. The through holes (40, 41) include the upper through hole (40) provided in the upper rear portion of the air cleaner box (30) and the lower through hole (41) provided in the lower front portion of the air cleaner box (30). Since the upper through hole (40) is positioned more inward in the vehicle width direction than the lower through hole (41), the through holes corresponding to the shape of the rear frame can be obtained, and the two through holes are provided at different positions in the vertical direction and the vehicle width direction, whereby convection of the outside air is further promoted to improve intake efficiency.

According to the sixth feature, the air cleaner box (30) includes at least the main case (34) and the outer cover (33) attached to the outer side of the main case (34) in the vehicle width direction. The air inlet (31) is formed in the outer cover (33). Since the upper through hole (40) and the lower through hole (41) are disposed between the outer cover (33) and the main case (34), the work of assembling the air cleaner box by sandwiching the frame member between the outer cover and the main case is facilitated.

DETAILED DESCRIPTION OF THE INVENTION

Figure 1:
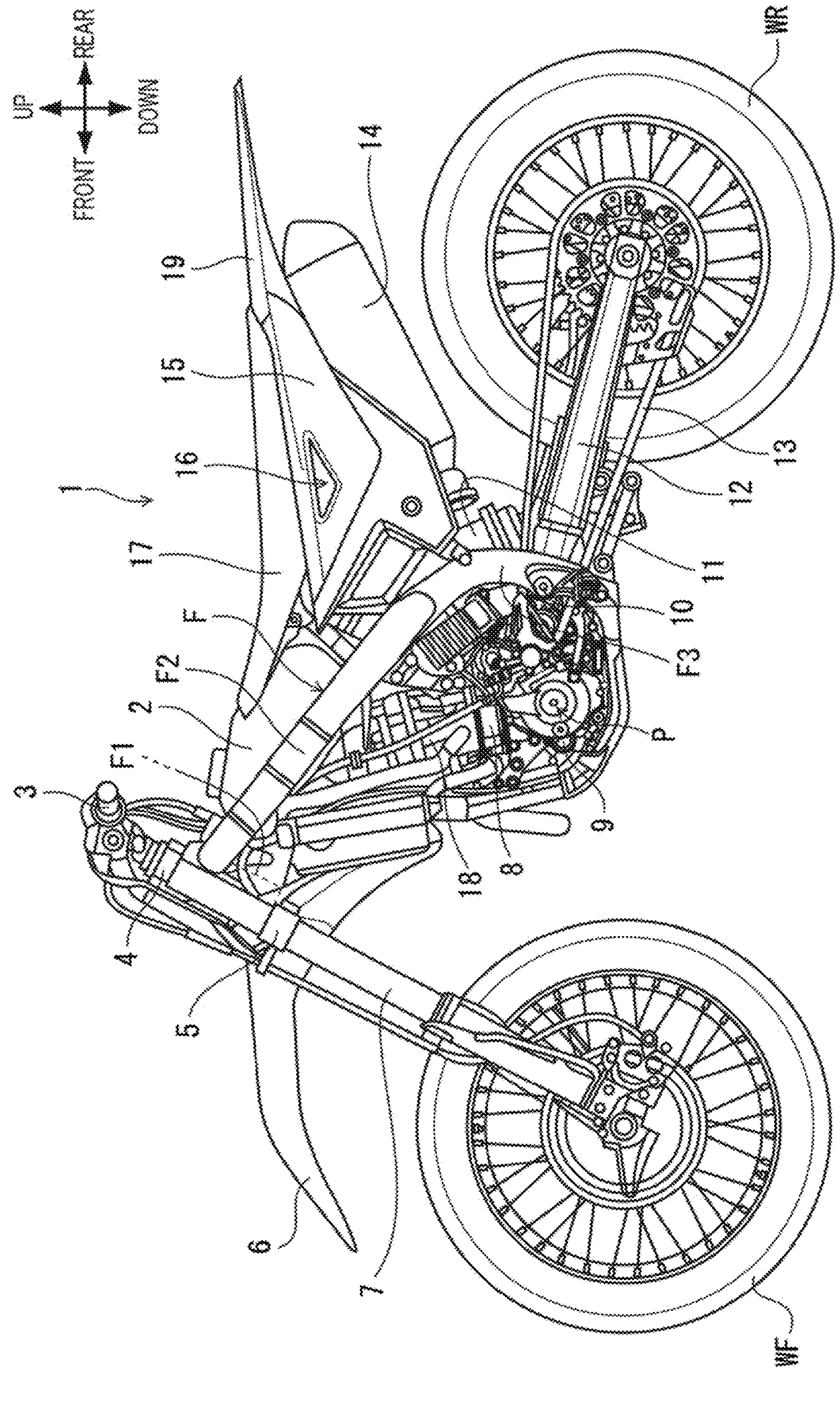
FIG. 1 is a left side view of a motorcycle according to the present embodiment.

A preferred embodiment of the present invention will now be described in detail with reference to the drawings. FIG. 1 is a left side view of a motorcycle 1 according to the present embodiment. The motorcycle 1 is an off-road type saddled vehicle that transmits power of a power unit P in which an engine and a transmission are integrated to a rear wheel WR via a drive chain 13.

A head pipe F1 rotatably supporting a steering stem shaft (not shown) is attached to front end portions of a pair of left and right main frames F2 constituting a vehicle body frame F. A top bridge 4 is fixed to an upper end portion of the steering stem shaft, and a bottom bridge 5 is fixed to a lower end portion of the steering stem shaft. A front wheel WF is rotatably supported at lower end portions of a pair of left and right front forks 7 supported by the top bridge 4 and the bottom bridge 5. A steering handlebar 3 is attached to an upper portion of the top bridge 4, and a front fender 6 positioned above the front wheel WF is attached to the front fork 7.

A pair of right and left pivot frames F3 are connected to a lower rear end of the main frame F2. The pivot frame F3 supports a pivot 10 that supports a swing arm 12 in a vertically swingable manner. A rear wheel WR is rotatably supported at a rear end portion of the swing arm 12. The swing arm 12 is suspended from the main frame F2 by a rear cushion 11 via a link mechanism.

The power unit P is suspended below the main frame F2 and in front of the pivot 10. A cylinder block 8 that slidably houses a piston and a cylinder head 18 that houses a valve mechanism are attached to an upper portion of a crank case 9 that houses a crankshaft of the power unit P. The combustion gas of the power unit P is discharged rearward from a muffler 14 at the rear of the vehicle body.

A fuel tank 2 is disposed at the top of the main frame F2, and a seat 17 is disposed behind the fuel tank 2. A pair of left and right side covers 15 are disposed below the seat 17, and a rear fender 19 is disposed at a rear portion of the side cover 15. An opening 16 for introducing outside air into an air cleaner box (not shown) is provided in the side cover 15 on the left side in the vehicle width direction.

Figure 2:
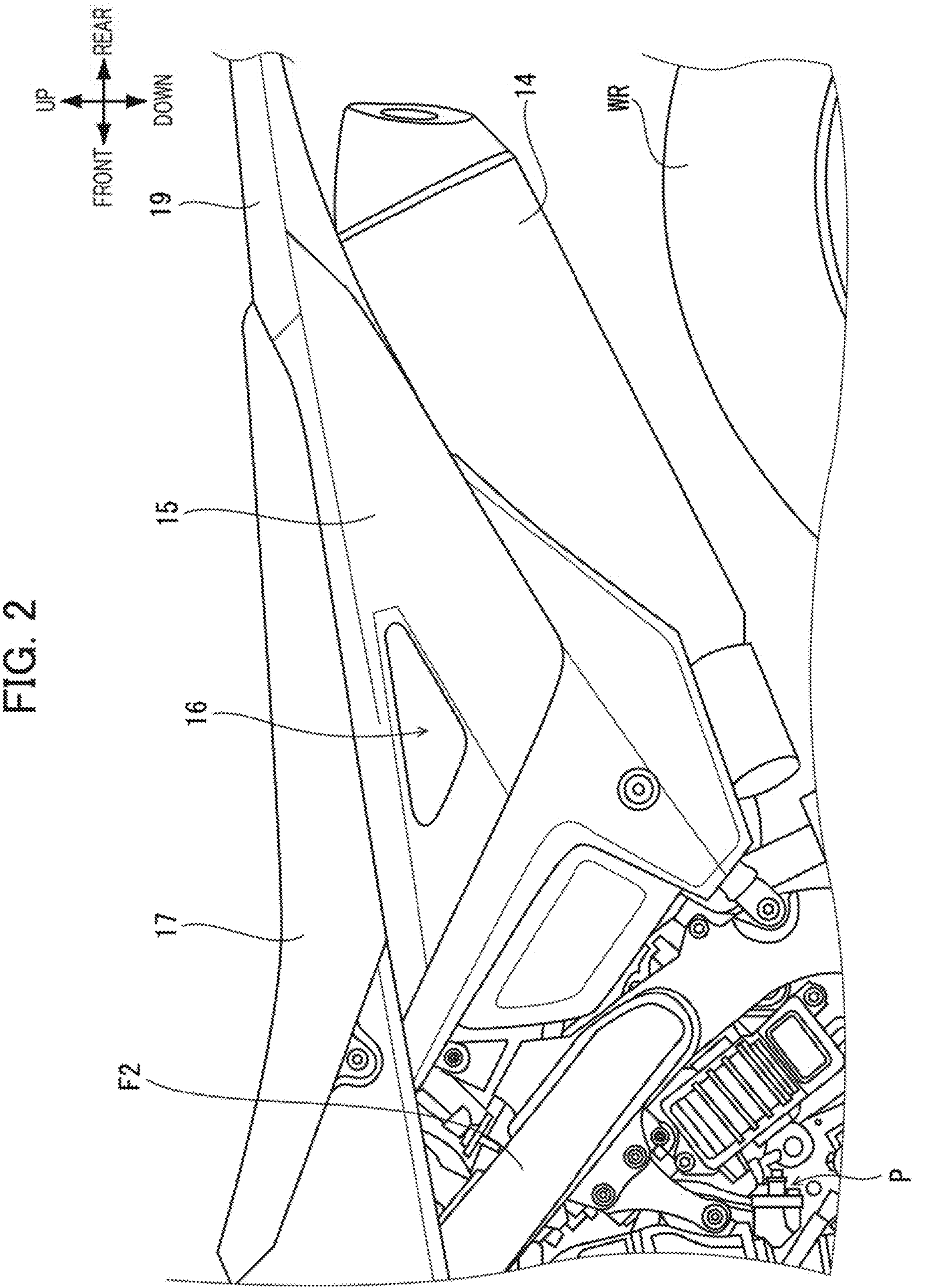
FIG. 2 is a partially enlarged view of FIG. 1.
Figure 3:
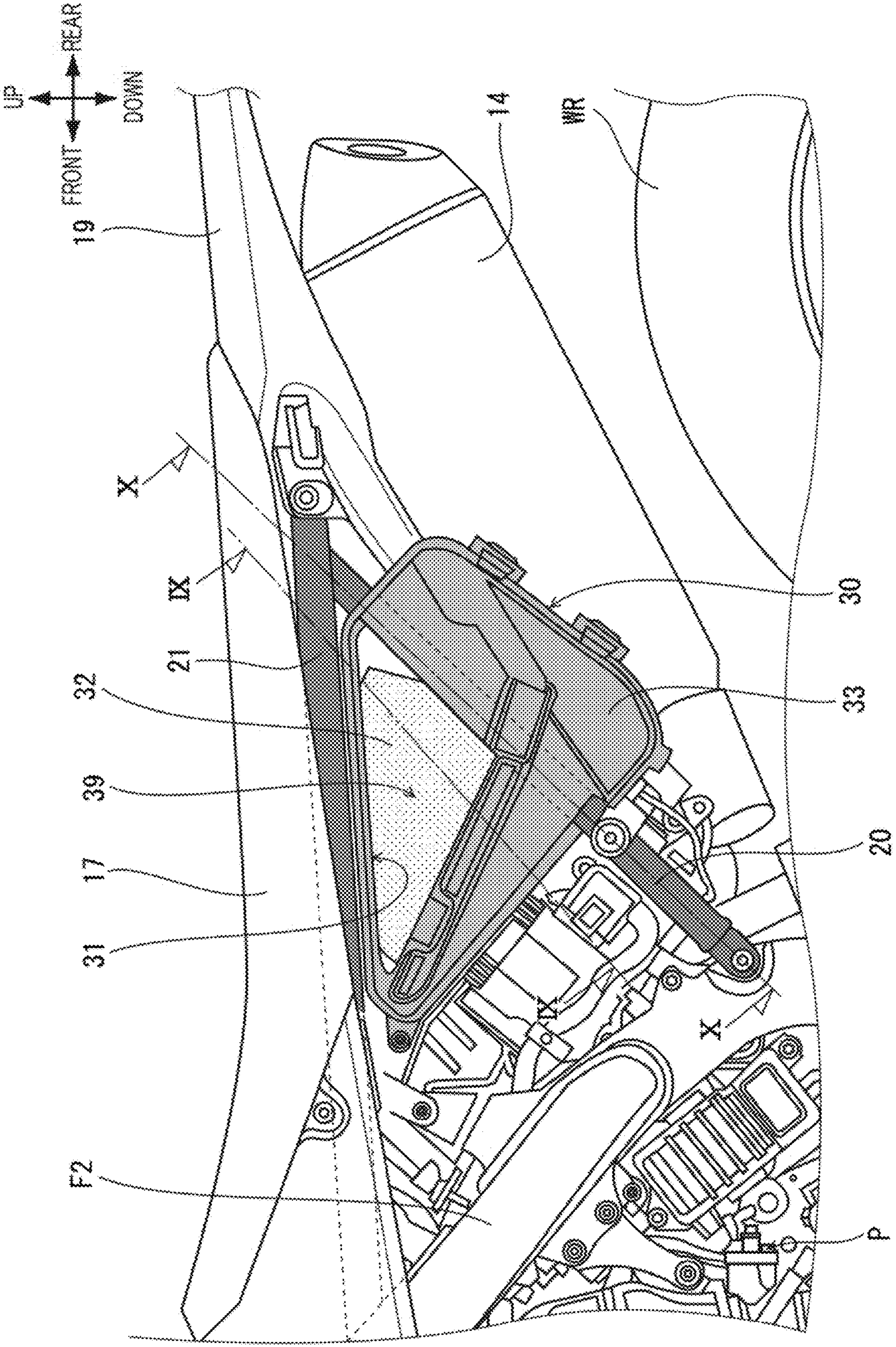
FIG. 3 is a left side view in which a side cover is removed from the state shown in FIG. 2.

FIG. 2 is a partially enlarged view of FIG. 1. FIG. 3 is a left side view in which the side cover 15 is removed from the state shown in FIG. 2. The vehicle body frame F includes a pair of left and right seat frames 21 (dark gray colored portion in the figure) that extend rearward and upward from the main frame F2 to support the seat 17, and a pair of left and right rear frames 20 (dark gray colored portion in the figure) that support the seat frames 21 from below. The opening 16 having a substantially triangular shape for introducing outside air into the air cleaner box 30 is provided in the side cover 15 on the left side in the vehicle width direction. The outside air introduced into the air cleaner box 30 passes through an air filter 32 (a dotted hatched portion in the figure) and is then supplied to an intake path of the power unit P.

An outer cover 33 (light gray colored portion in the figure) is attached to the left side portion of the air cleaner box 30 that houses the air filter 32. The outside cover 33 is provided with a substantially triangular air inlet 31 for introducing outside air. The present embodiment is characterized in that the rear frame 20 on the left side in the vehicle width direction penetrates through the air cleaner box 30. The air inlet 31 communicates with a space 39 upstream of the air filter 32 in the intake passage.

Figure 4:
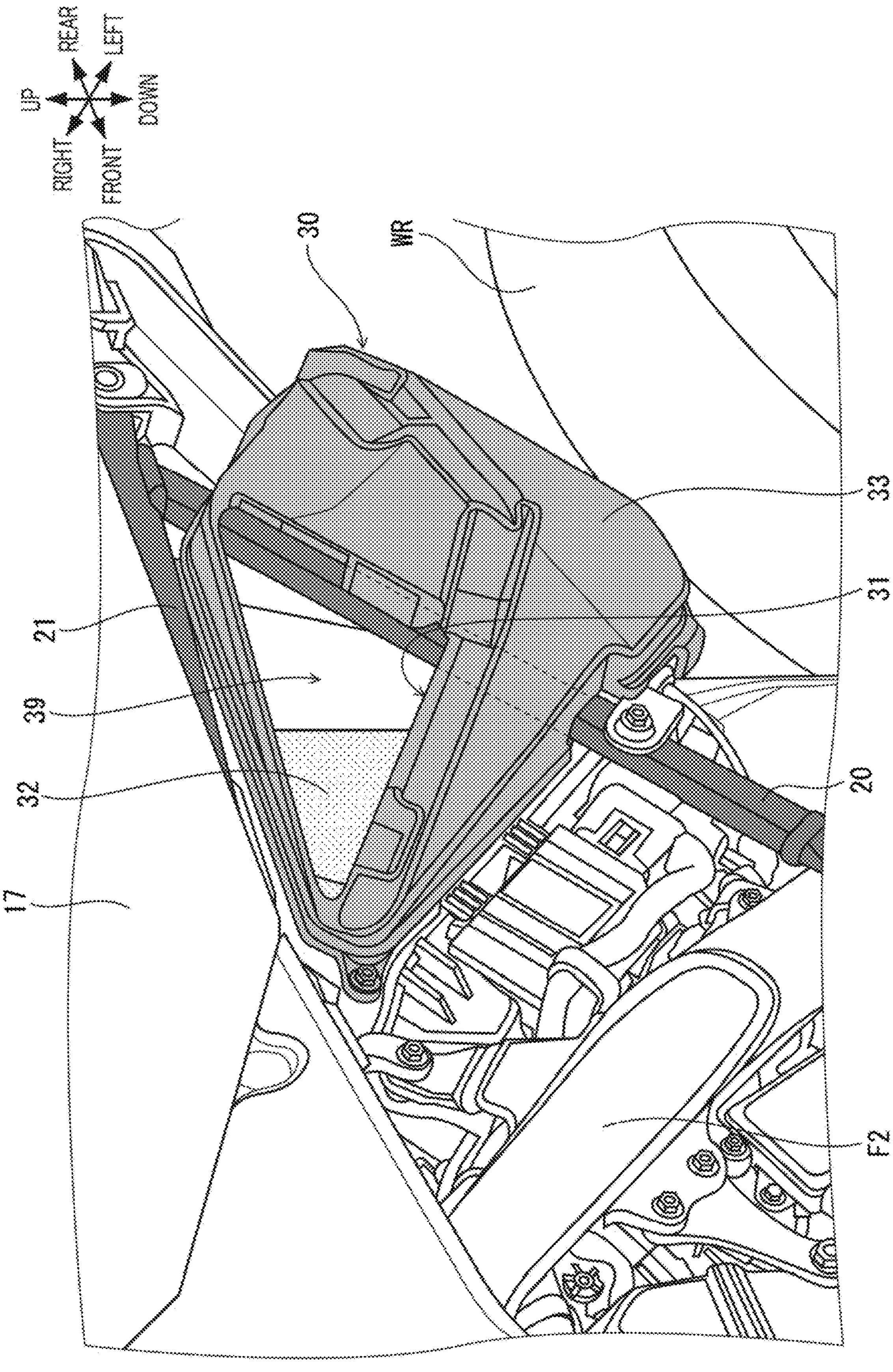
FIG. 4 is a perspective view showing the mounting structure of an air cleaner box.

FIG. 4 is a perspective view showing the mounting structure of the air cleaner box 30. This figure shows a state seen from the left front of the vehicle body. As described above, the rear frame 20 on the left side in the vehicle width direction penetrates through the air cleaner box 30, whereby the air cleaner box 30 does not remain in the space surrounded by the main frame F2, the seat frame 21, and the rear frame 20, but has a shape enlarged to the lower rear side of the rear frame 20 and the outer side in the vehicle width direction. That is, since the rear frame 20 penetrates through the air cleaner box 30, the capacity of the air cleaner box 30 can be increased without changing the configuration of the vehicle body frame F, and the degree of freedom of the shape and arrangement of the air cleaner box 30 can be increased while preventing the size of the vehicle body from increasing.

Figure 5:
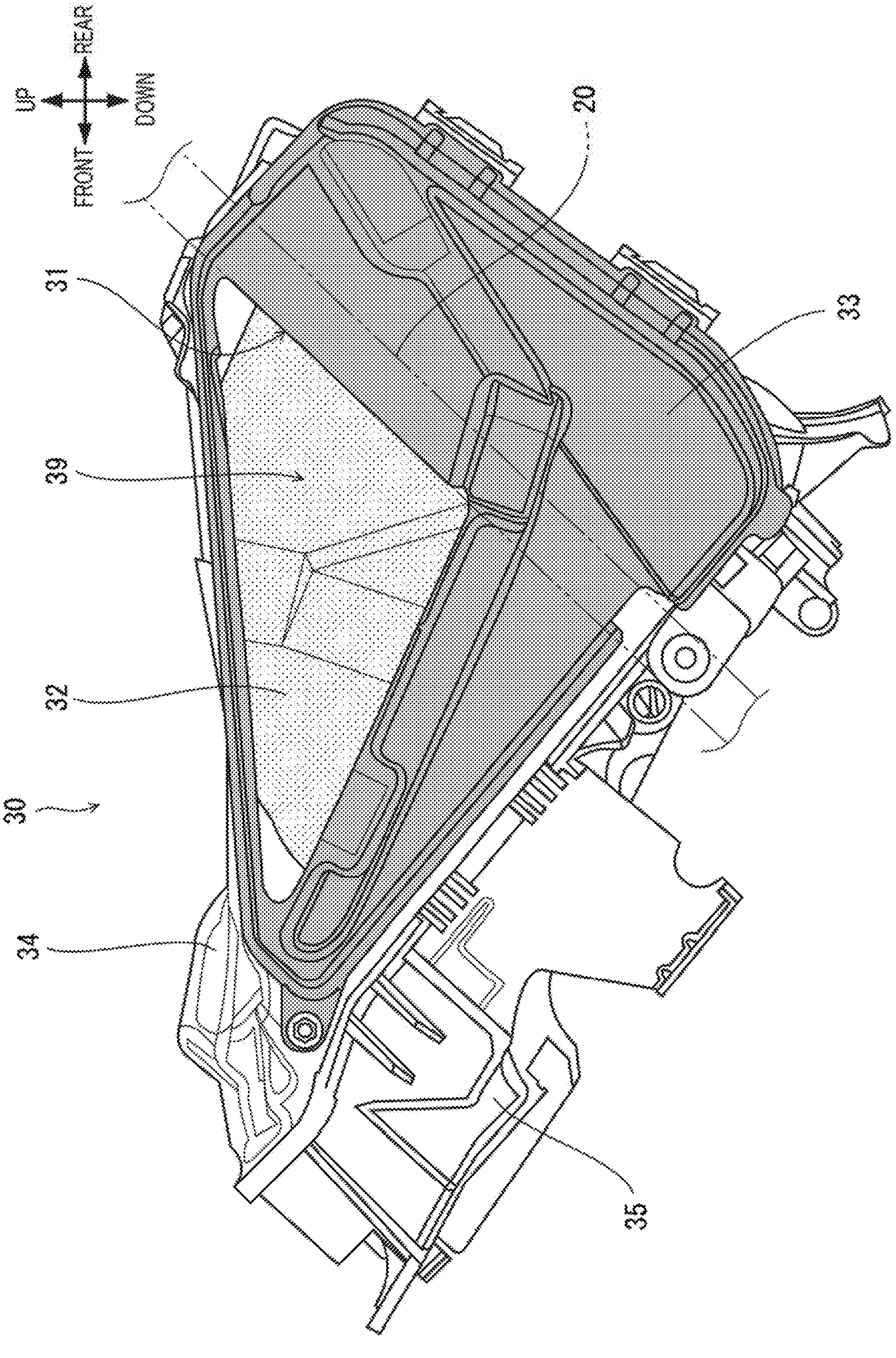
FIG. 5 is a left side view of the air cleaner box.
Figure 6:
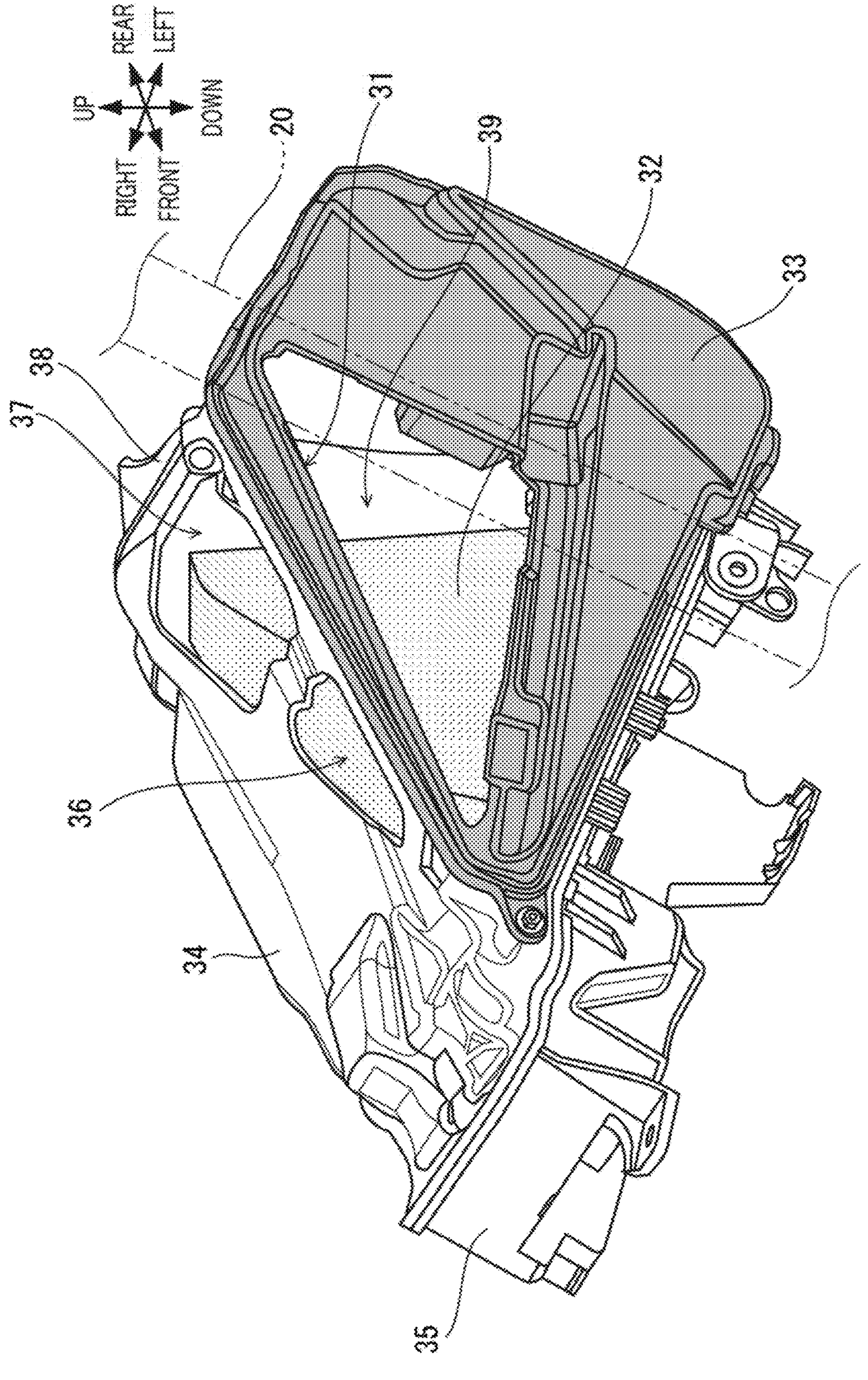
FIG. 6 is a perspective view of the air cleaner box viewed from the upper left front side.
Figure 7:
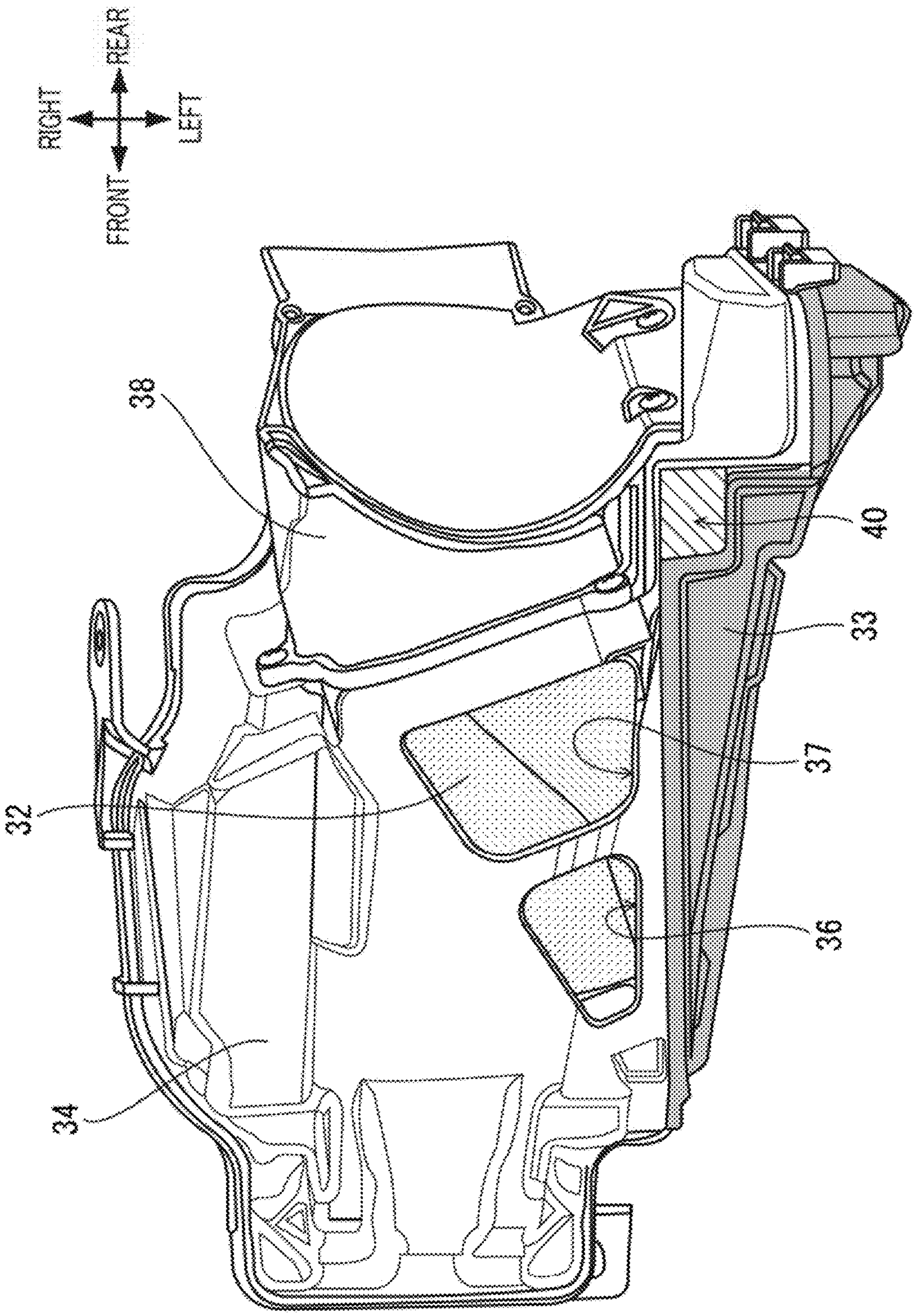
FIG. 7 is a plan view of the air cleaner box viewed from the axial direction of an upper through hole.
Figure 8:
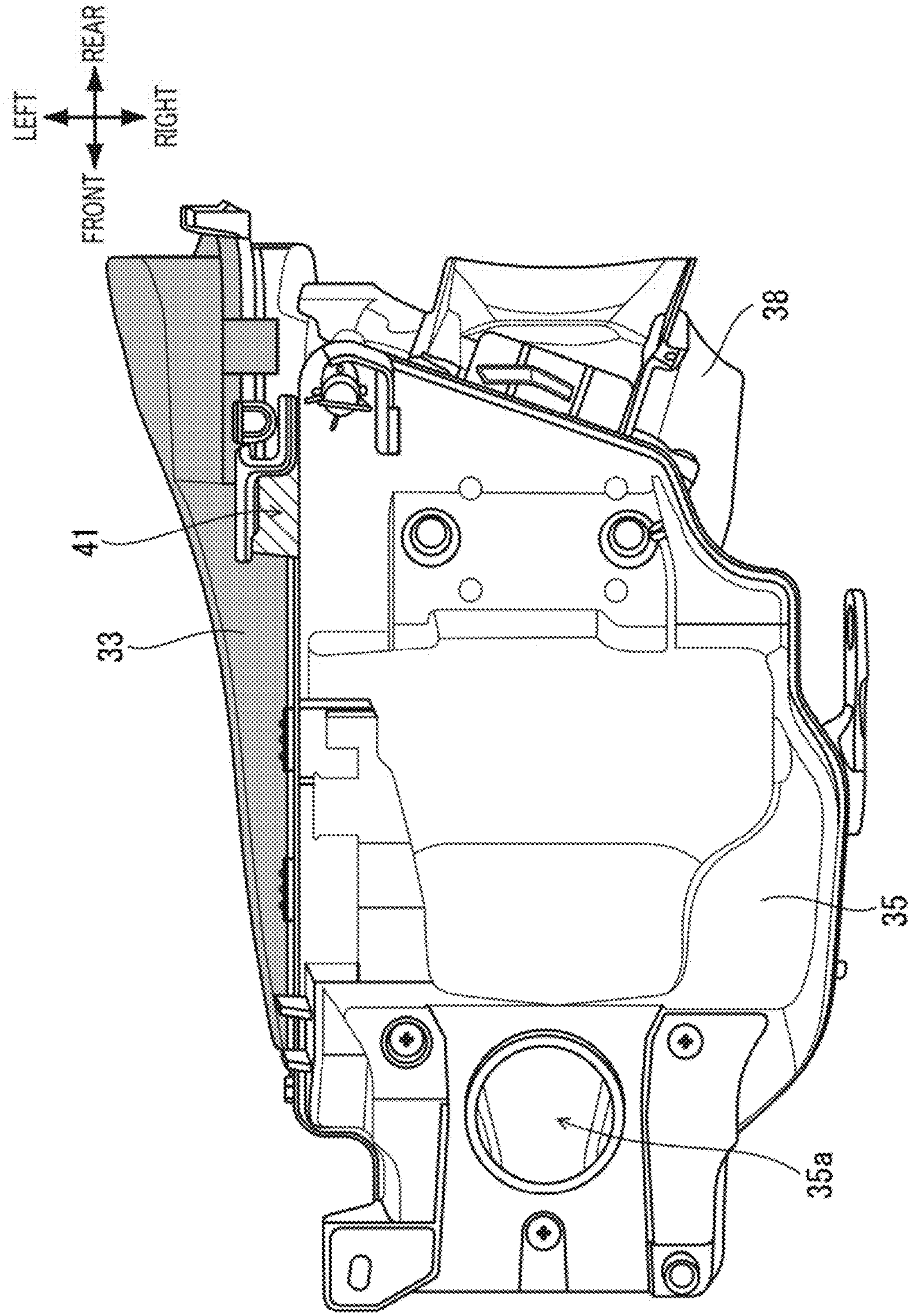
FIG. 8 is a bottom view of the air cleaner box viewed from the axial direction of a lower through hole.

FIG. 5 is a left side view of the air cleaner box 30. FIG. 6 is a perspective view of the air cleaner box 30 viewed from the upper left front side. FIG. 7 is a plan view of the air cleaner box 30 viewed from the axial direction of an upper through hole 40. FIG. 8 is a bottom view of the air cleaner box 30 viewed from the axial direction of a lower through hole 41. The air cleaner box 30 composed of synthetic resin or the like includes a main case 34 that houses the air filter 32, the outer cover 33 that is attached to a left side surface of the main case 34, a lower case 35 that is attached to a lower portion of the main case 34, and a rear case 38 that is attached to a rear portion of the main case 34.

A second air inlet 36 and a third air inlet 37 are formed in a top surface of the main case 34. An air outlet 35*a* for supplying outside air having passed through the air filter 32 to the intake path of the power unit P is formed on the lower surface of the lower case 35. The upper through hole 40 (diagonally hatched portion in the figure) through which the rear frame 20 passes is provided on the upper surface of the air cleaner box 30, and the lower through hole 41 (diagonally hatched portion in the figure) through which the rear frame 20 passes is provided on the lower surface of the air cleaner box 30. The second air inlet 36 and the third air inlet 37 may not be provided.

In the present embodiment, the rear frame 20 on the left side in the vehicle width direction passing through the air cleaner box 30 is disposed along the lower edge of the air inlet 31 inclined rearward and upward. As a result, the rear frame 20 does not block the air inlet 31, and the rear frame 20 functions as a guide for guiding outside air to the air inlet 31, thereby increasing intake efficiency. Furthermore, in the present embodiment, since the rear frame 20 is composed of a rectangular pipe material, the guide function of guiding outside air to the air inlet 31 can be further enhanced by a planar portion of the rear frame 20.

The pair of left and right rear frames 20 are inclined rearward and upward in a side view of the vehicle body, and are formed to be directed inward in the vehicle width direction toward the rear. As a result, the rear frame 20 on the left side in the vehicle width direction passes through the lower through hole 41 formed in the lower portion of the air cleaner box 30 and the upper through hole 40 formed in the upper portion of the air cleaner box 30 and positioned more inward in the vehicle width direction than the lower through hole 41. This enables the upper through hole 40 and the lower through hole 41 corresponding to the shape of the rear frame 20 to be obtained.

The upper through hole 40 and the lower through hole 41 are disposed between the outer cover 33 and the main case 34. This facilitates the formation of the upper through hole 40 and the lower through hole 41, and also facilitates the work of assembling the air cleaner box 30 by sandwiching the rear frame 20 between the outer cover 33 and the main case 34.

Figure 9:
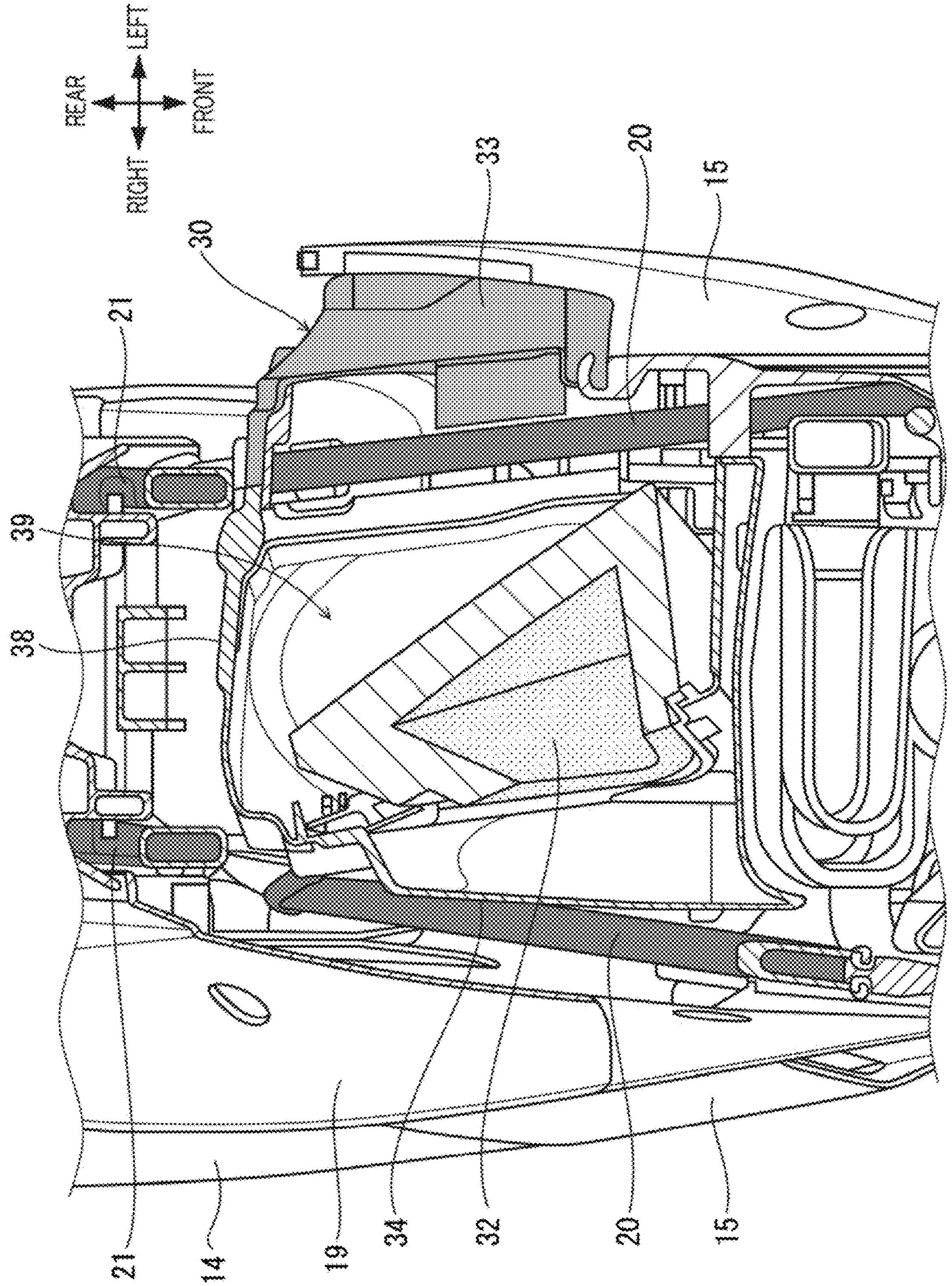
FIG. 9 is a sectional view taken along line IX-IX of FIG. 3.
Figure 10:
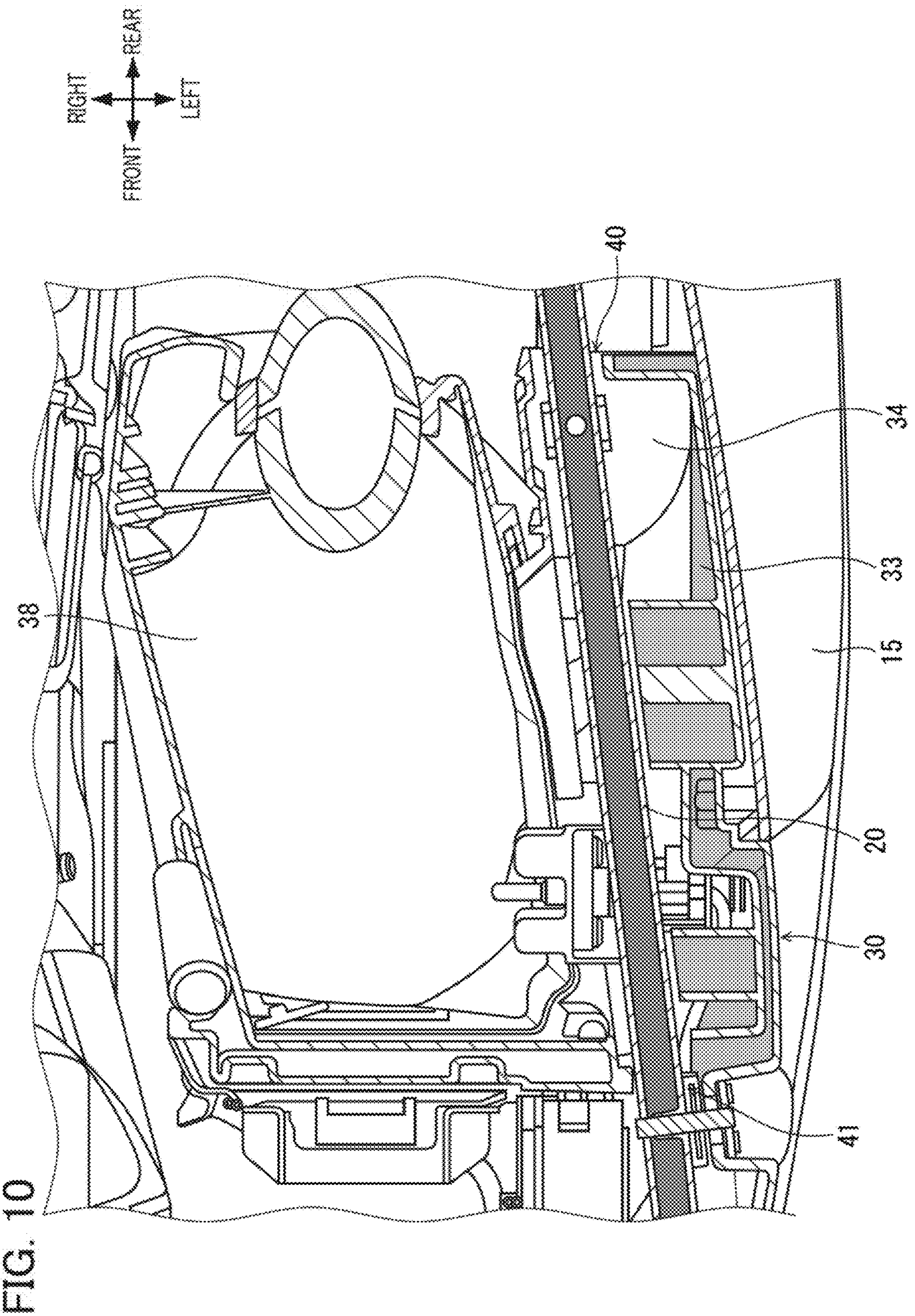
FIG. 10 is a sectional view taken along line X-X of FIG. 3.

FIG. 9 is a sectional view taken along line IX-IX of FIG. 3. FIG. 10 is a sectional view taken along line X-X of FIG. 3. As described above, the pair of left and right rear frames 20 are inclined rearward and upward in a side view of the vehicle body, and are formed to be directed inward in the vehicle width direction toward the rear. The upper through hole 40 and the lower through hole 41, through which the rear frame 20 passes, communicate with the space 39 upstream of the air filter 32 in the intake passage. This allows outside air to be introduced into the space 39 from the gaps between the through holes 40, 41 and the rear frame 20, in addition to the air inlet 31, thereby causing convection of the outside air in the space upstream of the air filter 32 and improving intake efficiency.

Furthermore, as described above, since the upper through hole 40 is positioned more inward in the vehicle width direction than the lower through hole 41, the upper through hole 40 and the lower through hole 41 corresponding to the shape of the rear frame 20 can be obtained, and the upper through hole 40 and the lower through hole 41 are provided at different positions in the vertical direction and the vehicle width direction, whereby convection of outside air is further promoted to improve intake efficiency.

The form of the motorcycle, the configuration of the vehicle body frame, the shape and the structure of the rear frame, the shape and the structure of the air cleaner box, the shape and the arrangement of the air inlet, the shape and the structure of the air filter, the shape and the arrangement of the upper through hole and the lower through hole, the type and the shape of the frame member penetrating through the air cleaner box, and the like are not limited to the above embodiment, and various modifications are possible. For example, the air cleaner box may be disposed at a position closer to the right side in the vehicle width direction. The air cleaner box structure according to the present invention can be applied to various vehicles including an air cleaner box.

EXPLANATION OF REFERENCE NUMERALS

1 motorcycle (saddled vehicle), 20 rear frame (frame member), 30 air cleaner box, 31 air inlet, 32 air filter, 33 outer cover, 34 main case, 39 space upstream of air filter, 40 upper through hole (through hole), 41 lower through hole (through hole), p power unit, F vehicle body frame

What is claimed is:

1. A saddled vehicle comprising an air cleaner box for introducing outside air into an intake path of a power unit,
- wherein an air filter is housed in the air cleaner box,
- wherein the air cleaner box comprises a main case and an outer cover, and
- wherein a frame member constituting a vehicle body frame of the saddled vehicle penetrates through the interior space of the air cleaner box via through holes provided in the air cleaner box.

2. The saddled vehicle according to claim 1,
- wherein an air inlet for introducing the outside air is formed in an outer side surface of the air cleaner box in a vehicle width direction, and
- wherein the frame member is disposed along an edge of the air inlet in a side view of a vehicle body.

3. The saddled vehicle according to claim 2, wherein the frame member comprises a rectangular pipe material.

4. The saddled vehicle according to claim 1,
- wherein an air filter is housed in the air cleaner box, and
- wherein a through hole through which the frame member passes communicates with a space upstream of the air filter in an intake passage.

5. The saddled vehicle according to claim 4,
- wherein the frame member is a rear frame that is inclined rearward and upward in a side view of a vehicle body and that is directed inward in a vehicle width direction toward rear,
- wherein the through hole comprises an upper through hole provided in an upper rear portion of the air cleaner box and a lower through hole provided in a lower front portion of the air cleaner box, and
- wherein the upper through hole is positioned more inward in the vehicle width direction than the lower through hole.

6. The saddled vehicle according to claim 5,
- wherein the air cleaner box comprises at least a main case and an outer cover attached to an outer side of the main case in the vehicle width direction,
- wherein an air inlet is formed in the outer cover, and
- wherein the upper through hole and the lower through hole are disposed between the outer cover and the main case.

7. The saddled vehicle according to claim 1,
- wherein the frame member is a rear frame,
- the air cleaner box is located within the space enclosed by at least a main frame, a seat frame, and the rear frame.

8. A saddled vehicle comprising an air cleaner box for introducing outside air Into an intake path of a power unit,
- wherein a frame member constituting a vehicle body frame of the saddled vehicle penetrates through the air cleaner box, and
- wherein an air inlet for introducing the outside air is formed in an outer side surface of the air cleaner box in a vehicle width direction, and wherein the frame member is disposed along an edge of the air inlet in a side view of a vehicle body.

* * * * *